United States Patent [19]
Johnson et al.

[11] Patent Number: 5,348,710
[45] Date of Patent: Sep. 20, 1994

[54] CATALYTIC DISTILLATION STRUCTURE

[76] Inventors: Kenneth H. Johnson, P.O. Box 630708, Houston, Tex. 77263; Albert B. Dallas, 5309 Ashby #33A, Houston, both of Tex. 77005

[21] Appl. No.: 75,328

[22] Filed: Jun. 11, 1993

[51] Int. Cl.$^5$ .................. B01J 8/02; B01D 50/00
[52] U.S. Cl. ................ 422/211; 422/171; 422/177; 422/179; 422/221; 422/311; 203/DIG. 6; 261/95; 502/159
[58] Field of Search ........... 422/171, 177, 211, 310, 422/311, 312, 179, 221; 203/DIG. 6; 502/159; 261/95

[56] References Cited

U.S. PATENT DOCUMENTS

| | | | |
|---|---|---|---|
| 4,302,356 | 11/1981 | Smith, Jr. | 252/426 |
| 4,443,559 | 4/1984 | Smith, Jr. | 502/527 |
| 4,455,339 | 6/1984 | Meier | 428/185 |
| 4,497,751 | 2/1985 | Pluss | 261/94 |
| 4,497,752 | 2/1985 | Huber | 261/95 |
| 4,497,753 | 2/1985 | Streiff | 261/95 |
| 4,731,229 | 3/1988 | Sperandio | 422/188 |
| 4,744,928 | 5/1988 | Meier | 261/95 |
| 5,057,468 | 10/1991 | Adams | 502/1 |
| 5,073,236 | 12/1991 | Gelbein et al. | 203/29 |
| 5,189,001 | 2/1993 | Johnson | 502/159 |

FOREIGN PATENT DOCUMENTS

| | | | |
|---|---|---|---|
| 0008860 | 10/1985 | European Pat. Off. | B01D 3/00 |
| 0396650 | 10/1992 | European Pat. Off. | |
| 1186647 | 4/1970 | United Kingdom | B32B 15/02 |
| 1471442 | 4/1977 | United Kingdom | B05D 1/00 |
| 1569828 | 6/1980 | United Kingdom | B01D 47/14 |
| 1604361 | 12/1981 | United Kingdom | F28C 1/00 |

*Primary Examiner*—Robert J. Warden
*Assistant Examiner*—Christopher Y. Kim
*Attorney, Agent, or Firm*—Kenneth H. Johnson

[57] ABSTRACT

A catalytic distillation structure comprises a plurality of corrugated vertically disposed catalyst containing elements separated by inert spacing elements. The catalyst containing elements each comprise two layers of gas permeable material, such as wire mesh, joined together at regularly spaced intervals to form a single sheet having pockets disposed on the surface. A particulate catalyst is disposed within the pockets. The catalyst within the pockets provides a reaction zone where catalytic reactions may occur and the gas permeable sheets provide mass transfer surfaces to effect a fractional distillation. The spacing elements allow for a variation of the catalyst density and loading.

16 Claims, 2 Drawing Sheets

CATALYTIC DISTILLATION STRUCTURE

BACKGROUND OF THE INVENTION

1. Field of the Invention

The invention relates generally to a structure that performs the dual function of reaction catalyst and mass transfer surface for distillation. More particularly, the invention relates to a fixed distillation structure which contains a solid particulate catalyst.

2. Related Art

The concurrent reaction and separation of products from reactants has been practiced for some time, and the advantages have been recognized. Examples of the use of concurrent reaction and distillation are disclosed in U.S. Pat. Nos.: (etherification) 4,232,177; 4,307,254; 4,336,407; 4,504,687; 4,918,243; and 4,978,807; (dimerization) 4,242,530; (hydration) 4,982,022; (dissociation) 4,447,668; and (aromatic alkylation) 4,950,834 and 5,019,669.

Several different catalytic distillation structures have been proposed. See for example U.S. Pat. Nos. 4,302,356 and 4,443,559 in which a particulate catalyst is contained within the pockets on a cloth belt wound with demister wire to form a catalytic distillation structure and U.S. Pat. No. 4,731,229 which discloses a packing with corrugated elements and tape form catalyst member. More recently high efficiency packing has been modified to contain catalyst as is disclosed in U.S. Pat. No. 5,073,236. In the latter each of the structures, comprising two parallel gas permeable plates having the catalyst between them, are vertically placed within a column directly adjacent another pair of the plates containing the catalyst. The close packing of plates containing the catalyst when placed into the column may present too dense a catalyst bed in some instances and thus increase the residence time beyond that necessary for a given reaction. It is an advantage of the present invention that greater mobility of fluids within the columns can be obtained in some of the embodiments. It is a further advantage that the catalytic distillation structure offers better distillation characteristics than many of those of the prior. It is a feature of the present invention that less catalytic material may be employed with the present structures.

SUMMARY OF THE INVENTION

The present invention provides a more versatile system by separating at least one pair of adjacent elements containing catalyst with a spacing element comprising an inert element. For example, the spacing element may be a flat plate (gas permeable or solid), an element similar to the catalyst containing element containing inert particles or an element similar to the catalyst containing element, only void. By varying the number of spacing elements the desired volume of catalyst may be placed in a column while utilizing a standard catalyst containing element. In one embodiment the catalytic elements may be spaced apart to allow open space between some or all of the structures.

If consistent flow characteristics are desired across the diameter of the column, the spacing elements can be identical with the particulate catalytic material of the catalyst containing elements being replaced with inert packing of similar size and shape. Additionally the catalyst or other packing may simply be omitted to provide alternative flow characteristics.

DESCRIPTION OF THE PREFERRED EMBODIMENTS

In the present invention a catalytic structure is comprised of at least two catalytic elements in one or more of the following configurations:

A. spaced apart

B. contiguous with an inert element selected from:
1. the package element
2. the non-catalytic element
3. a flat plate (gas permeable or impermeable)

Preferably the catalytic structure will contain a plurality of catalytic elements in the configuration described above. For example, in one preferred embodiment as shown in FIG. 6 the catalytic structure is comprised of two groups of contiguous catalytic elements separated by a space. In another preferred configuration shown in FIG. 5 there is a plurality of catalytic elements in the structure, each separated by a space so that there are no contiguous catalytic elements and no adjacent catalytic elements are in contact. These two configurations are an advantage over structure as shown in U.S. Pat. No. 5,073,236, because they allow more open space within the catalytic structure. In many applications a dense structure having contiguous catalytic elements would be a barrier and in effect act more like a packed bed of particulate catalytic material with consequent high pressure drops of a packed column.

Figure 7:
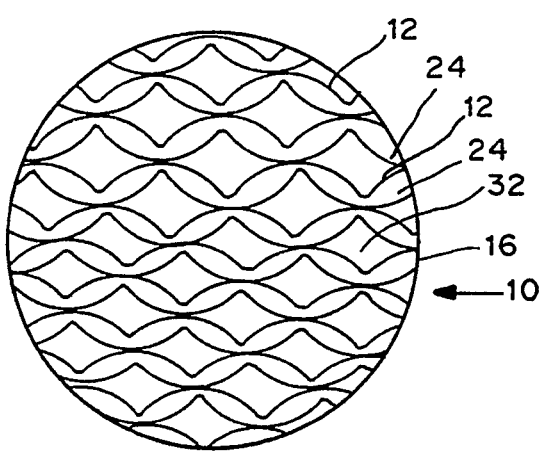
FIG. 7 is a plurality of packages each touching and contiguous to any adjacent package unit.

The catalytic structure depicted in FIG. 7, however, supplies the denser packing, but with an important distinction from the prior art. Some of the packages shown are void of any particulate material and/or contain inert particulate material. The void packings are less dense and provide excellent distillation characteristics with a great deal of open space and surfaces. The inert elements are the packings filled with inert particulate material that may be the same size, smaller or larger than the catalytic particulate material. The inert elements allow for all of the same hydraulic characteristics of the catalytic elements but reduce the catalytic reactions, which in catalytic distillation also designated reactive distillation (U.S. Pat. No. 5,019,669) is frequently a reversible reaction. Hence, by diluting the reactive elements but maintaining the distillation elements a higher degree of the separation aspect of the catalytic distillation is obtainable. In other words, by dispersing the inert elements between the catalytic elements, is a given structure the fractional separation is emphasized, while in the system as a whole comprising a column with a plurality of the catalytic structures the force of the reaction is maintained.

The dilution of the volume of catalyst present in any given column may be insignificant given the dynamic, nature of catalytic distillation and the improved distillation characteristics described above.

The catalytic and non-catalytic elements are bound together to form a structure, usually by plastic or metal bands at the upper and lower ends of each grouping of elements. Where spaces are desired a spacer in the nature of a frame is placed between the elements to be separated.

The term package is used to describe the corrugated sheets joined to form containers for particulate catalytic material and particulate inert material. The corrugated sheets may be joined by welding or by weaving, crimping and bending. The corrugated sheets are arranged in parallel to a common axis and present open channels between the sheets for the distribution and fractional distillation of fluid streams.

The corrugations and the channels and pockets of particulate material on each sheet are disposed at an inclination from the common axis while being oppositely directed to the corrugations of an adjacent sheet.

For a detailed description of the preferred embodiments the reader is referred to the attached figures in which like components are given like numerals for ease of reference.

Figure 1:
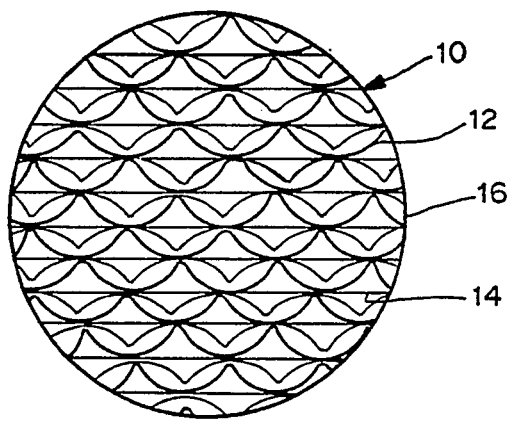
FIG. 1 is a top view in partial cross section of a structure showing catalyst containing elements and spacing elements of the present invention.
Figure 2:
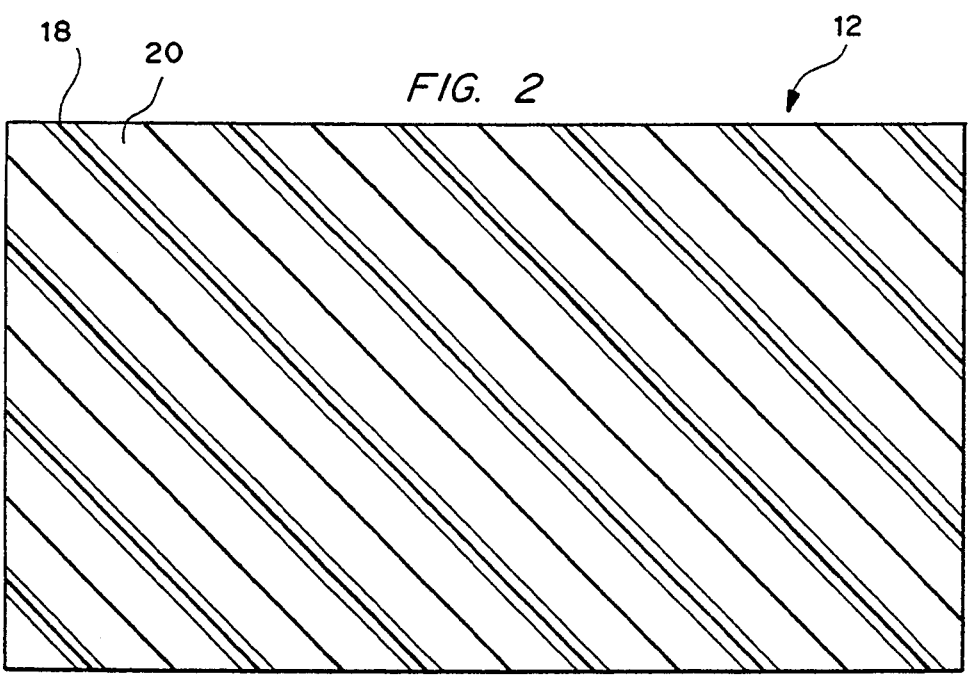
FIG. 2 is a side view of one catalytic element of FIG. 1.
Figure 3:
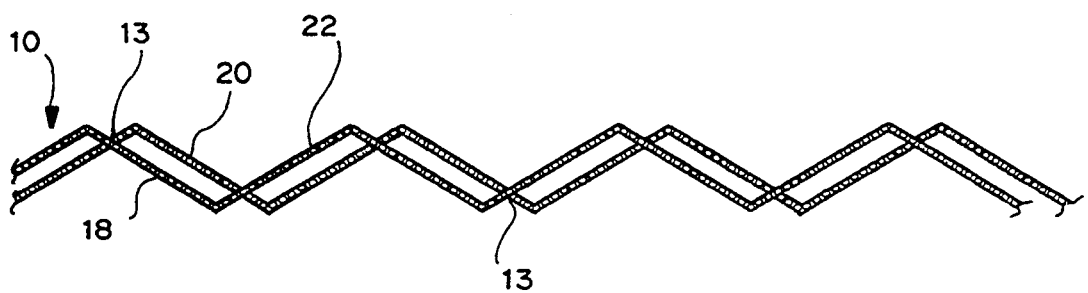
FIG. 3 is a cross section of one package element of the invention.
Figure 4:
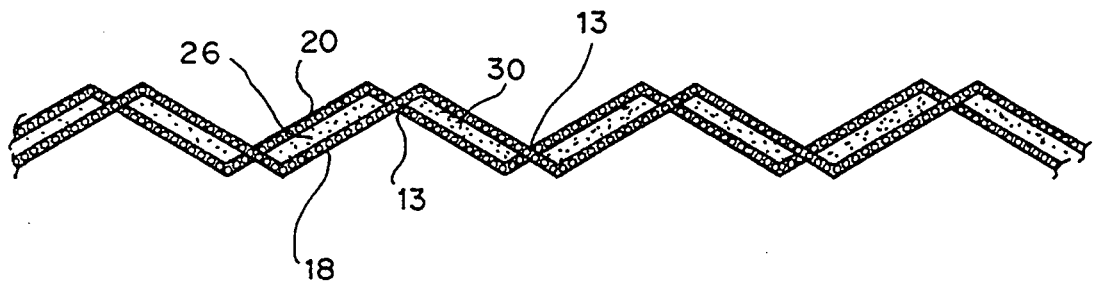
FIG. 4 is the package element according to the present invention containing particulate material.

In FIG. 1 there is shown a top view in plan of a catalytic structure 10 of the present invention, which is comprised of a plurality of catalytic elements 12 aligned along a common axis each being separated by a non-catalytic sheet 14 which may be permeable or non-permeable. The elements are held together by band 16. In FIG. 2 a catalytic element is shown to comprise two layers 18 and 20 of gas permeable wire mesh which are joined in regularly spaced intervals to form pockets 22 in which a particulate catalyst may be disposed or which may be employed empty as described hereafter. The joining can be effected by weaving the two layers together at the joints 13. A particular embodiment involves a double weave type process in which the mesh is woven as a double weave with the pockets integral with the weave. Additionally the pockets are woven diagonally across the surface of the element as shown in FIG. 3. The appearance of the elements is that of a corrugated herring bone (see FIGS. 3 and 4).

In FIG. 7 there is shown a view of several of the catalyst containing elements 12 separated by inert spacing 24. In this preferred embodiment each catalytic element 12 is separated by a non-catalytic distillation structure 24 which may either be the empty pocket structure of FIG. 3 or the pockets may be filled with particulate material 26 such as FIG. 4. The pocket elements containing the particulate material may contain either catalytic particulate material or inert particulate material. The elements appear to be the same and only the nature of the particulate material distinguishes them. FIG. 6 shows a similar view of a structure where all of the pocket elements are catalytic elements 12 and the two portions of contiguous catalytic elements are separated by a space 28 such that the catalytic elements are not contiguous across the entire catalytic structure.

Figure 5:
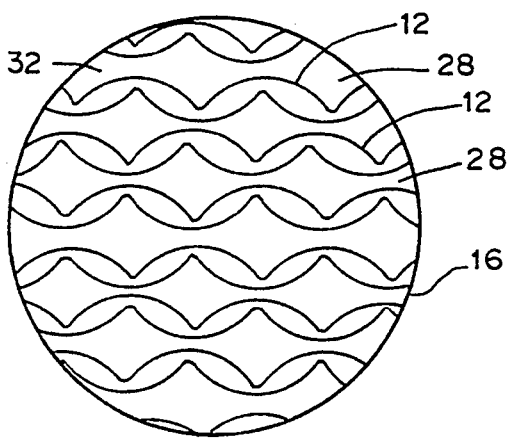
FIG. 5 is a structure comprising a plurality of catalytic elements spaced apart.
Figure 6:
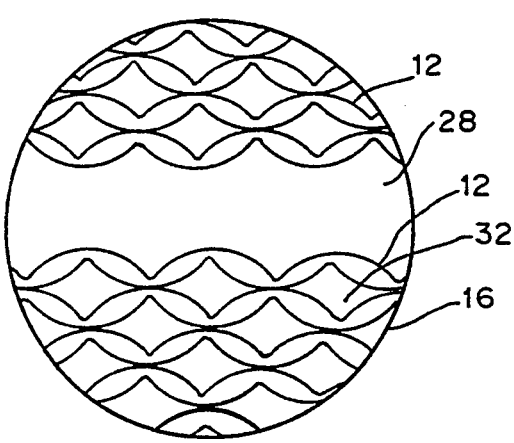
FIG. 6 is a plurality of catalytic elements with only one adjacent pair spaced apart.

In FIG. 5 a bundle of the catalytic distillation structure is shown ready for placement in a distillation column reactor. The catalytic elements 10 are shown to be spaced apart by an open space elements 28 and the whole bound into a bundle by band 16. All of the elements bound by the band are placed vertically within the column.

Figure 8:
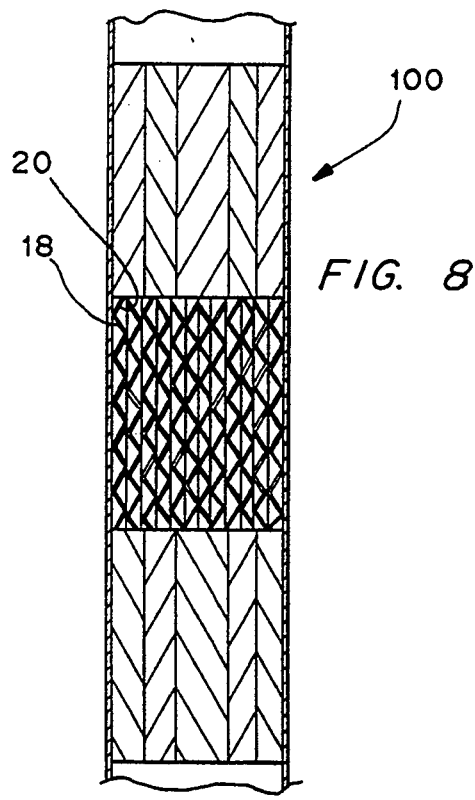
FIG. 8 is a partial side view of a reaction distillation column with the structure according to the present invention in place.

Referring now to FIG. 8 there is shown a distillation column reactor 100 containing a bundle of catalytic distillation structure 10 of the type shown in FIG. 7. Preferably the horizontal pocketed catalyst containing elements are placed together such the pockets of one element are at 90° to the pockets of the next adjacent pocket element whether empty (no particulate material), filled with particulate catalyst or filled with inert material so that fluid streams flow along the channels at angles to the vertical axis of the column. This feature is illustrated in FIG. 8 where the slanted lines on the upper and lower tower sections represent the ridges of the sheets.

The structure 10 operates as a structured packing for fractional distillation of fluid streams and concurrently provides for catalytic reaction of the fluid streams. In a typical installation, a plurality of structures 10 are stacked one on top of the other inside the column on an appropriate support structure. Each vertical row of structures is placed with its sheets 18 and 20 parallel to other sheets in the same row and at 90° relative to the plane of the sheets in a vertically adjacent row. This relative orientation of three vertically spaced rows of sheets is illustrated in FIG. 8. The structure 10 has particular applicability with liquid phase reactions having products separable by distillation and counter current gas/liquid contacting in liquid phase heterogeneous catalyst systems. In operation, one or more fluid streams are charged to the column 100 with liquid descending through structure 10 and vapor streams ascending through the structure. The liquid stream flow occurs in channels 32 along the surface of sheets 18 and 20 and through the catalyst bed 30 and the inert bed in element 24. Liquid distributors may be utilized at the upper end of structure 10 to preferentially direct the liquid streams as desired into either the channels 32 or catalyst bed 30.

The catalyst bed 30 forms a catalytic reaction zone for catalytically reacting the descending liquid streams. Concurrently, a vapor phase is formed by fractional distillation of the liquid streams and preferentially flows upwardly through channels 32 for mixing with descending liquid streams. Mass transfer between the liquid and vapor phases occurs primarily on the surfaces of the sheets 18 and 20 as well as on the catalyst.

Mixing of the liquid and vapor phases occurs in channels 32 as ascending vapor contacts descending liquid. The liquid phase passes through the permeable elements 18 and 20 from the channels into the catalyst bed 22 for catalytic reaction or into the inert bed of element 24 for further separation. The reaction product likewise passes from the catalyst bed into the channels where primary fractional distillation occurs.

It will be appreciated that more than one bundle may be placed in the column at various heights as desired. Additionally the bundle or bundles may be supported in the column in any efficient manner. For instance the bundles may be supported and separated by inert distillation packing such as Rashig rings or the like.

We claim:

1. A catalytic distillation structure for disposition in a distillation column reactor, comprising:
   (a) plurality of catalytic elements aligned along a common axis and each comprising:
      (i) a first and second layer of gas permeable wire mesh material joined together at intervals to form a corrugated sheet having a plurality of pockets disposed thereon; and (ii) particulate catalyst disposed within said pockets; and (b) an inert spacing element disposed between at least two adjacent of said plurality of catalytic elements wherein said inert spacing element comprises a corrugated sheet comprising a third and fourth layer of gas permeable wire mesh material joined together to form a plurality of empty pockets disposed on said sheet.

2. The catalytic distillation structure according to claim 1 wherein said inert spacing element comprises open space.

3. The catalytic distillation structure according to claim 1 wherein said inert spacing element comprises a flat member.

4. The catalytic distillation structure according to claim 3 wherein said flat member is gas permeable.

5. The catalytic distillation structure according to claim 3 wherein said flat member is gas impermeable.

6. The catalytic distillation structure according to claim 1 wherein a portion of said pockets have inert particulate matter disposed therein.

7. The catalytic distillation structure according to claim 1 wherein said pockets are disposed diagonally across said sheet.

8. The catalytic distillation structure according to claim 1 wherein said gas permeable wire mesh material is a woven wire mesh.

9. The catalytic distillation structure according to claim 1 wherein said inert spacing elements comprise a single sheet of wire mesh.

10. The catalytic distillation structure according to claim 1 wherein said inert spacing element is disposed between each of said plurality of catalytic elements.

11. The catalytic distillation structure according to claim 10 wherein said inert spacing element comprises open space.

12. The catalytic distillation structure according to claim 10 wherein said inert spacing element comprises a flat member.

13. The catalytic distillation structure according to claim 12 wherein said flat member is gas permeable.

14. The catalytic distillation structure according to claim 12 wherein said flat member is gas impermeable.

15. The catalytic distillation structure according to claim 10 wherein a portion of said pockets have inert particulate matter disposed therein.

16. A distillation column reactor for concurrently carrying out reactions and separating the products from the reactants, comprising:

(a) a vertically disposed vessel;

(b) a catalytic distillation structure disposed therein, comprising:

(i) plurality of catalytic elements aligned along a common axis and each comprising:

(A) a first and second layer of gas permeable wire mesh material joined together at intervals to form a corrugated sheet having a plurality of pockets disposed thereon;

(B) particulate catalyst disposed within said pockets; and (ii) an inert spacing element disposed between at least two adjacent of said plurality of catalytic elements wherein said inert spacing element comprises a corrugated sheet comprising a third and fourth layer of gas permeable wire mesh material joined together to form a plurality of empty pockets disposed on said sheet.

* * * * *